Sept. 16, 1969        J. R. BARR        3,467,800
REVERSIBLE CAM ACTUATING MECHANISM FOR ELECTRIC SWITCHES
Filed March 21, 1967        2 Sheets-Sheet 2
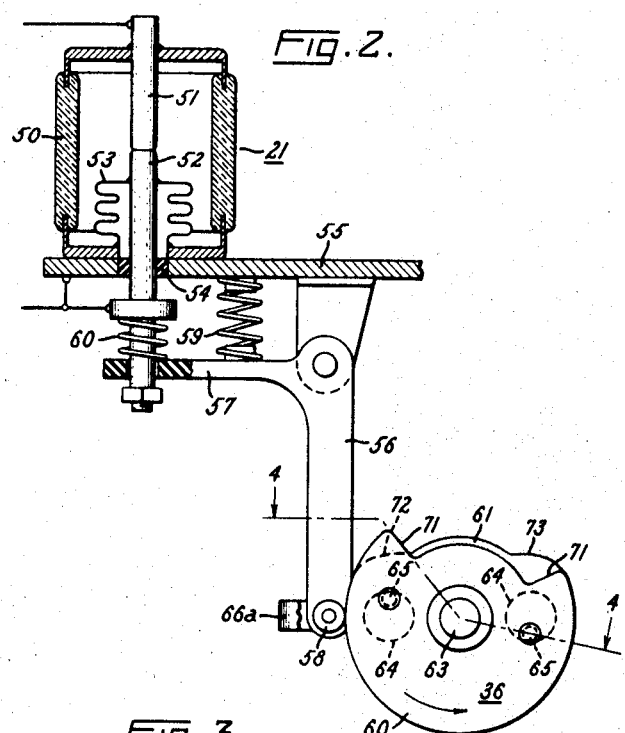
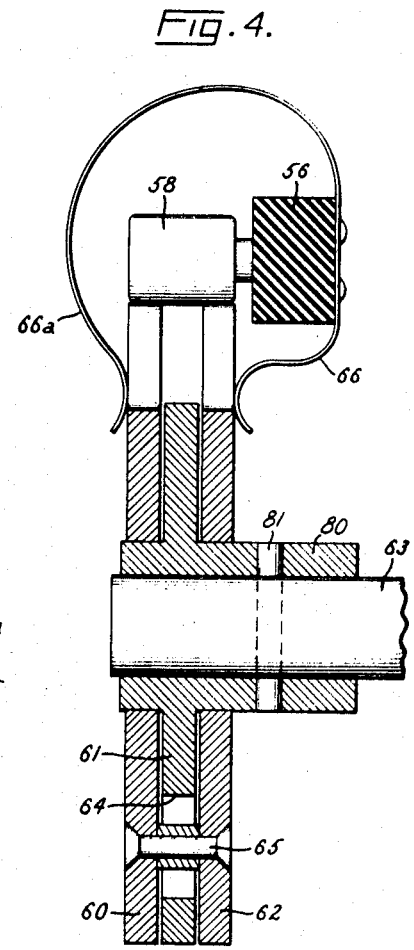
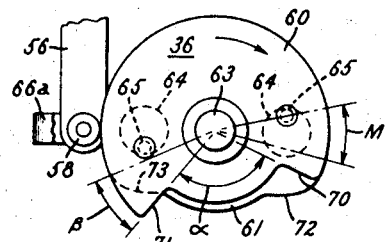
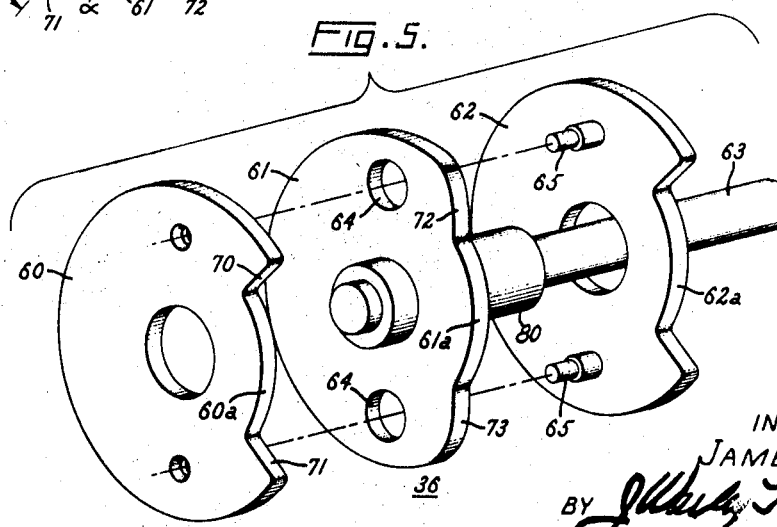
INVENTOR:
JAMES R. BARR,
BY *[signature]*
ATTORNEY

United States Patent Office 3,467,800
Patented Sept. 16, 1969

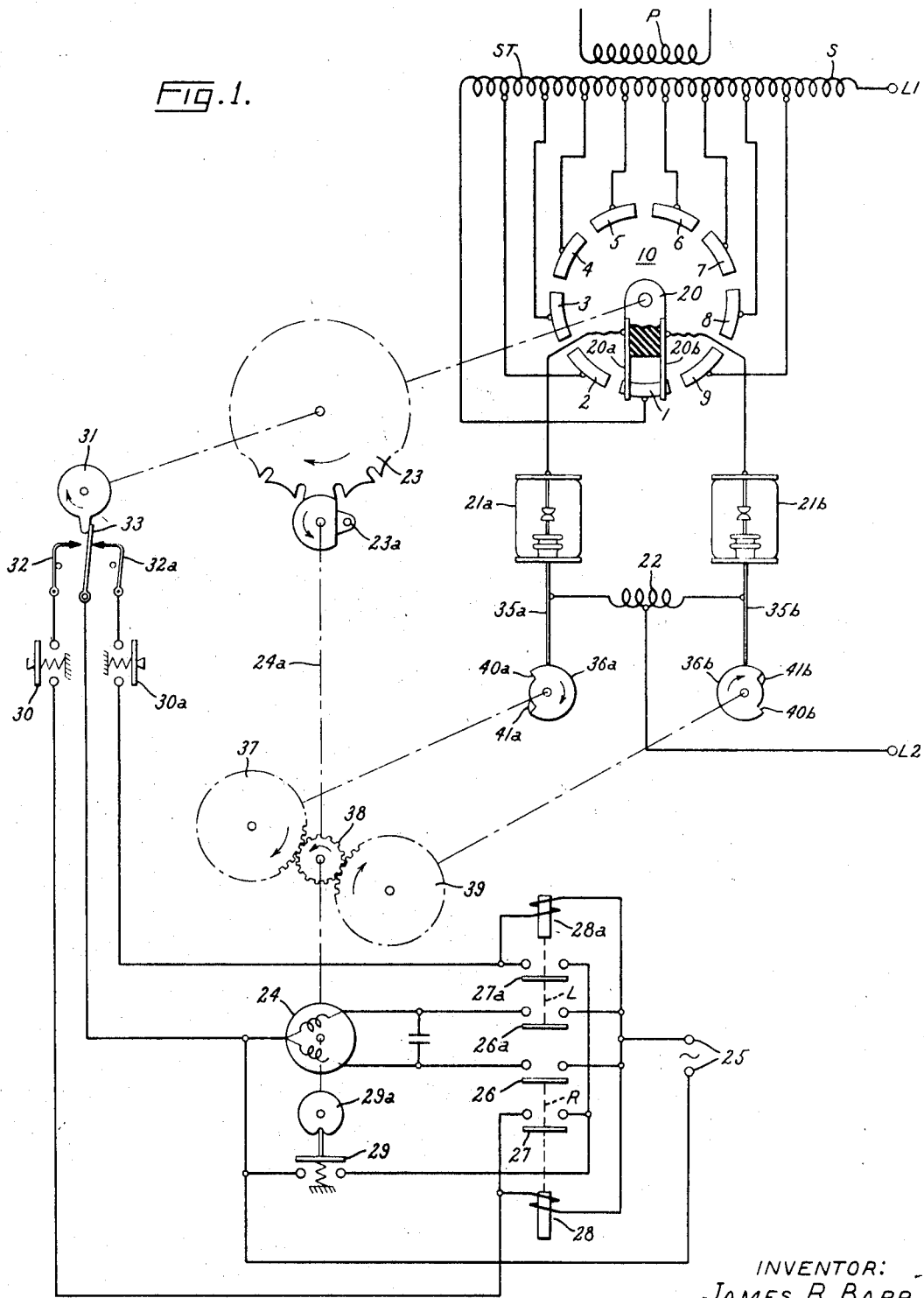

3,467,800
REVERSIBLE CAM ACTUATING MECHANISM FOR ELECTRIC SWITCHES
James R. Barr, Rome, Ga., assignor to General Electric Company, a corporation of New York
Filed Mar. 21, 1967, Ser. No. 624,856
Int. Cl. H01h 19/58, 21/78, 9/30
U.S. Cl. 200—153    4 Claims

ABSTRACT OF THE DISCLOSURE

A reversible cam-type switch actuating mechanism, particularly for vacuum type circuit interrupting devices, wherein two juxtaposed cam plates having a lost-motion connection therebetween are reversibly driven by positive connection to one of the plates. A switch-opening cam surface on one disk is laterally adjacent a switch-closing cam surface on the other plate, and the surfaces are alternately exposed to a common follower as a result of lost-motion displacement of the plates in response to reversal of cam movement.

---

My invention relates to reversible cam actuating mechanisms for electric switches and is particularly adapted for alternate closing and opening of vacuum type circuit interrupting devices. Its reversibility makes it especially suitable for use in tap selector or other notching sequences, as in transformer tap changers, motor speed controllers and the like. The invention is particularly useful in the adaptation of vacuum type circuit interrupting devices to reversible step-by-step selector circuits.

A typical application for reversible selector switching is in tap-changing apparatus for power transformers. When transformer tap changes are made under load current conditions, it is necessary to employ arcing duty switches, either individually associated with each tap or in series with a tap selector switch. In transformer tap changers, such arcing duty switches are commonly located under oil or other dielectric fluid, but in the past they have been located in separate compartments to prevent contamination of the main body of dielectric liquid in the transformer. This structure may be simplified and reduced in cost by use of vacuum type circuit interrupting devices. Because such devices are of sealed construction, they may be located directly in the transformer tank and immersed in the main body of dielectric liquid without danger of contaminating the liquid.

Transformer tap-changing apparatus, especially when automatically controlled for voltage or current regulation, is called upon to perform its operation at a high repetition rate. A vacuum type arc interrupter used in such apparatus therefore operates very frequently and must have an operating life measured in many thousands and preferably millions of switching operations. When such a vacuum interrupting device is located in the main tank of a liquid immersed transformer or the like, it is especially important that the device function dependably over a long period of time because of the difficulty and expense of exposing it for maintenance.

To ensure long operating life to a vacuum interrupting device, it is essential that the operating speed of its contacts be carefully controlled to minimize arcing in both opening and closing operation. Proper contact operating speed presents an additional problem in that opening speed must be relatively high to ensure current interruption at the first current zero with minimum arcing, while contact-closing speed must be considerably lower to avoid contact bounce and consequent arcing.

Accordingly, it is a general object of my invention to provide improved reversible cam-actuating means for electric switches having separable contacts.

It is another object of my invention to provide a reversible switch-actuating cam arranged to open an electric switch at one speed and to close at a different speed regardless of the direction of cam rotation.

It is a more particular object of my invention to provide reversible cam actuating means for an electric switch which is designed to effect one or more complete cycles of switch-opening and switch-closing operation at different contact speeds as the cam moves in one direction and upon reversal of cam movement to reverse the order of events without change in the speed of operation associated with each event.

In carrying out my invention in one preferred embodiment, I provide a reversibly movable switch operating cam having a follower coupled directly to the movable contact of an electric switch such as a vacuum interrupting device. For a full cycle of switch operation in each direction of movement, the cam is provided with two actuating surfaces spaced apart in the direction of traverse so that in either direction of movement the cam follower will first open and then close the vacuum interrupter or vice versa. In order that opening action will be rapid and closing action relatively slow, regardless of the direction of cam movement, the cam is formed of at least two laterally juxtaposed cam plates having a lost-motion connection therebetween and disposed for cooperation with a common follower. In a preferred configuration the cam is of the rotatable disk type, and comprises at least two laterally adjacent disks having a limited degree of relative angular displacement, or lost motion, between them. One disk is formed to provide two angularly spaced-apart quick-actuating surfaces; the other is formed to provide two slow-actuating surfaces having substantially the same angular spacing therebetween and disposed each in lateral juxtaposition with one of the quick-actuating surfaces. Each actuating surface has an effective length along the line of traverse equal to or less than the linear displacement of the cam surfaces permitted by the lost-motion connection, so that when either slow-actuating surface is exposed to the cam follower, the other slow actuating surface is withdrawn behind the juxtaposed quick-operating surface on the other disk. By providing a positive drive connection to only one disk, the relative positions of the disks are reversed due to the lost motion connection whenever the direction of rotation is reversed. In this way the relative angular positions of the exposed slow-actuating and quick-actuating surfaces are reversed. The loosely mounted driven disk is preferably repositioned and maintained at the trailing limit of its lost-motion connection in each direction of rotation by means of a frictional brake or the like. Such rotatable disk cams may be operated for any desired number of complete switching cycles in either direction of rotation before reversal.

My invention will be more fully understood and its various objects and advantages further appreciated by referring now to the following detailed specification taken in conjunction with the accompanying drawing wherein:

FIG. 1 is a schematic circuit diagram of a transformer load tap changing apparatus including vacuum type arc interrupting switches actuated by rotatable cams to which my invention is applicable;

FIG. 2 is an elevational view of a cam-operated switch actuating mechanism including my invention;

FIG. 3 is a detail view of the cam and follower shown at FIG. 2 in reversed rotational orientation;

FIG. 4 is a cross-sectional view of the cam and follower taken along the planes 4—4 of FIG. 2; and FIG. 5 is an exploded perspective view of the operating cam shown at FIGS. 2, 3 and 4.

Referring now to the drawing, I have shown at FIG. 1 a schematic circuit diagram of a transformer load tap changing apparatus of a type to which my improved switch-operating mechanism is especially adapted. The transformer itself comprises a pair of main windings P and S inductively coupled and preferably immersed in a dielectric fluid such as oil or askarel. The winding S is provided at one end with a tap section ST having a plurality of selectable voltage taps connected respectively to tap terminal contacts 1–9, inclusive, of a selector switch 10. The tap terminals 1–9 are arranged in a circular orientation for cooperation with a rotatable selector contact 20 having a pair of contact fingers 20a and 20b separately mounted upon an insulating support.

The transformer winding S is fixedly connected at one end to a line terminal L1, and at the other end a selected one or two of the tap terminals is connected through the tap selector switch 10 to a line conductor L2. In the tap selector circuit the contact fingers 20a and 20b are connected through vacuum interrupting devices 21a and 21b, respectively, to opposite ends of a current limiting reactor 22, and the center point of the reactor 22 is connected to the line L2. The tap selector contact 20 is driven in step-by-step manner by an indexing device shown as a Geneva gear 23 having 17 positions. In nine alternate positions, both selector contact fingers 20a and 20b rest upon a single one of the tap terminals 1–9, and in eight intermediate positions the contact fingers rest upon adjacent terminals.

The indexing Geneva gear 23 is driven by a single tooth pinion 23a mounted upon the shaft 24a of a reversible motor 24. The motor 24 is energized through either "raise" or "lower" contactors R and L, respectively, from a suitable source of alternating current supply indicated as a pair of supply terminals 25. The motor contactors R and L are provided, respectively, with main line contacts 26, 26a, holding contacts 27, 27a and actuating coils 28, 28a. Both holding circuits through the contacts 27, 27a include also a common limit switch 29 actuated by a motor driven cam 29a to open the operable contactor and thus the motor circuit after each single rotation of the Geneva gear driving pinion 23a.

The motor starting contactors R and L are energized, respectively, by suitable raise and lower control contacts 30, 30a. Preferably the contacts 30, 30a are mechanically or electrically interlocked (not shown) to prevent simultaneous operation. To limit rotation of the Geneva gear 23 to substantially a single revolution from either end position of the selector switch 10, I have shown a counting cam 31 cooperable with a pair of normally closed spring contacts 32, 32a through a pivoted actuating arm 33. The limit contacts 32, 32a are connected, respectively, in series with the control contacts 30, 30a, so that at one limit of movement of the selector switch 10, the "raise" contactor R is disabled (as shown in the drawing), and at the other limit of selector switch movement the "lower" contactor L is disabled.

The arcing duty vacuum interrupting devices 21a and 21b are provided with movable contact members 35a and 35b, respectively, biased to contact-opening positions and controlled by operating cams 36a and 36b, respectively. The cams 36a and 36b hold both vacuum switches in closed position whenever the tap selector switch 10 is in any one of its 17 rest positions. The switch operating cams 36a and 36b are driven through suitable gears 37, 38 and 39 from the motor drive shaft 24a. The gear ratio of the gears 37, 38 and 39 is such that for each single rotation of the shaft 24a and gear 38, each of the gears 37 and 39 produces a half revolution of the connected operating cams 36a and 36b.

A typical single operating cycle of the tap changing apparatus described above is as follows. With the selector switch 20 positioned on the end tap terminal 1 as shown, indexing movement of the selector switch must take place in a clockwise direction upon energization of the motor 24. When the control contact 30a is closed to energize the motor-starting contactor L, the motor shaft 24a makes a single rotation until stopped by the limit switch 29. This single rotation produces one indexing movement of the Geneva gear 23 and moves the tap selector contact 20 to its second position with the contact finger 20a on the tap terminal 2 and the contact finger 20b remaining on the tap terminal 1.

During this first clockwise indexing movement the circuit through the tap selector finger 20b is not broken, and it is therefore unnecessary to open the arcing switch 21b. During this indexing step the operating cam 36b rotates 180 degrees in a clockwise direction and does not disturb the closed position of the switch 21b. The selector finger 20a, however, moves from tap terminal 1 to tap terminal 2, and in order that current will not be interrupted by the finger 20a, the associated arcing switch 21a is open before the finger 20a leaves tap terminal 1 and reclose after it engages tap terminal 2. For this purpose the operating cam 36a rotates 180 degrees in a clockwise direction, and in so doing, first opens the switch 21a rapidly through a cam surface 40a and recloses the switch more slowly at a cam surface 41a. During this single indexing step, the counting cam 31 is advanced clockwise by one of its 17 steps through direct connection to the Geneva gear 23. In so moving, the cam permits reclosure of the limit switch 32, so that either direction of indexing movement may now be selected.

If now it is desired to move the tap selector contact 20 further clockwise in a second step of indexing movement, the "lower" contact 30a is again closed momentarily to re-energize the contactor L. The motor shaft 24a is thus actuated through a second single revolution and again stopped by its limit switch 29. In this second indexing step, each of the switch-operating cams 36a and 36b are again moved through 180 degrees in a clockwise direction. During this movement the cam 36a does not disturb the closed position of the arcing switch 21a, but the cam 36b first opens and then recloses its associated arcing switch 21b. Specifically the cam 36b, by means of a cam surface 40b, opens the switch 21b before the trailing contact finger 20b leaves the tap terminal 1, and then by means of a cam surface 41b, the switch 21b is reclosed after the contact finger 20b engages the tap terminal 2. In this second indexing movement, the counting cam 31 is advanced a second of its 17 steps.

It will now be understood by those skilled in the art that by subsequent actuations of the motor-starting contactor L, the tap selector contact 20 may be advanced clockwise in step-by-step manner through its remaining 15 positions. At the end of such advance, the counting cam 31 will open the limit switch 32a so that further clockwise or "lower" indexing is prevented. Similar indexing in the counterclockwise or "raise" direction may now be initiated by the control contact 30. Between the limits of movement of the selector switch 10, either direction of indexing movement may be selected for any one or more steps because both limit switches 32 and 32a are closed.

My invention concerns particularly the vacuum interrupting switch devices 21a, 21b and their respective reversible operating cams 36a and 36b. As the description of these devices proceeds, it will be understood by those skilled in the art that my invention is particularly directed to reversible operating cam means for switches, and particularly vacuum switches, in a variety of circuit dispositions. For example, in a transformer tap-changing device, individual normally open vacuum interrupting devices could be directly connected to each tap terminal and selectably closed in sequence by a suitable drum controller thereby eliminating the non-arcing selector switch 10. Moreover the invention is not limited in its application to use in transformer tap-changing circuits, but is equally adapted for use in connection with other reversible selector circuit applications, such as with motor-starting resistors and the like.

At FIG. 2, I have shown a cam-operated actuating mechanism for a vacuum interrupting device 21 which may, for example, be either of the vacuum switches 21a or 21b of FIG. 1. The vacuum interrupting device 21 of FIG. 2 comprises an evacuated envelope 50 in which are positioned separable switch contacts including a fixed contact rod 51 and a movable contact rod 52. The movable contact rod 52 is sealed to the envelope 50 by means of a re-entrant flexible bellows 53 and is slidably mounted in a suitable bearing 54 on a fixed supporting base 55. Pivotally mounted upon the supporting base 55 is an actuating lever 56 having an arm 57 coupled to the movable contact 52, and carrying at its other end a cam follower roller 58. The actuating lever 56 is biased by means of a spring 59 to maintain the movable contact rod 52 in its open circuit position, and a wipe spring 60 is provided between the actuating arm 57 and the contact rod to permit overtravel of the actuating lever in the circuit-closing direction.

Through the cam follower 58 the actuating lever 56 is controlled in its switch-opening and switch-closing movement by means of an operating cam 36 or 36b of FIG. 1. The cam 36 is shown in exploded perspective view at FIG. 5, and will be seen to comprise three laterally adjacent cam plates or disks 60, 61 and 62 mounted together in close juxtaposition upon a driving shaft 63. The central driving disk 61 has an axially extended hub 80 and is fixedly mounted upon the driving shaft 63 by means of a pin 81 through the hub. The outer driven disks 60 and 62 ride loosely upon hub 80 and thus are loosely mounted upon the shaft 63. These outer disks 60, 62 are fixedly connected together by means of stop pins 65 and provided with a limited amount of lost motion with respect to the driving disk 61 by reason of the fact that the pins 65 pass through enlarged apertures 64 in the driving disk. The cam follower 58 is common to all the cam disks and all or less than all of their peripheral surfaces as these surfaces are exposed in any cam position.

It will be observed from the foregoing that the relative angular position of the central driving disk 61 may vary with respect to the outer disks 60, 62 within the limits of the lost motion provided by the pin and slot connections 64, 65. In each direction of rotation of the positively connected driving disk 61, the loosely connected driven disks 60 and 62 will trail the driving disk at the limit of the lost motion provided. This is illustrated at FIGS. 2 and 3, wherein at FIG. 2 the cam 36 is shown in a condition of counterclockwise rotation with the disk 61 leading and the disk 60 trailing at the limit of the lost-motion connections 64, 65. At FIG. 3 the cam 36 is shown with the disks 60 and 61 in the relative disposition effected by clockwise rotation. In this case the central driving disk 60 is still in leading position and the driven disk 61 in the trailing position limited by the lost motion connection 63, 64. It will be understood that the relative angular disposition of the disks 60 and 61 is different at FIGS. 2 and 3 to the extent permitted by the limits of the lost-motion connection. This shift of position upon reversal of rotation is preferably positively effected by means of a frictional drag or other braking device operating upon the loosely mounted outer disks 60 and 62. Such a drag device is illustrated most clearly at the cross-sectional view of FIG. 4 wherein I have shown a pair of spring fingers 66, 66a mounted upon the switch actuating arm 56 and engaging opposite sides of the cam 36 by contact with the outer sides of the loosely mounted cam disks 60 and 62. It will be evident that the frictional drag exerted by the spring fingers 66 and 66a maintains the loosely mounted cam disks 60 and 62 constantly in trailing position and takes up the lost motion between the relatively movable cam disks upon reversal of rotation.

The effect of these relatively movable multiple cam disks may now be observed by referring particularly to FIGS. 2, 3 and 5. Each of the cam disks is formed to provide a radially depressed sector, shown respectively as portions 60a, 61a and 62a, in which the common follower 58 is in switch-opening position. These depressed sectors are defined at opposite ends by similar switch-actuating surfaces circumferentially spaced apart by the arcuate lengths of the respective sectors, i.e., spaced apart a predetermined distance along the line of traverse of the cam follower. The outer cams 60 and 62 are of the same shape and, as illustrated on the cam disk 60, are provided with circumferentially spaced-apart rapid switch actuating cam surfaces 70, 71. As indicated at FIG. 3, these surfaces are oriented substantially radially and are angularly spaced apart at a predetermined desired angle $\alpha$. The central driving cam 61 is similarly provided at opposite ends of its depressed sector 61a with slow switch actuating surfaces 72, 73 angularly spaced apart by the same angle $\alpha$ but having a more gradual slope than the abrupt surfaces 70, 71. The actuating surfaces 72, 73 are at an angle to the radial direction and thus move the cam roller 58 radially at slower switch-actuating speed.

As indicated at FIG. 3, each low speed actuating surface 72, 73 extends over a cam angle B which is no greater than the angular amount of lost motion (shown as an angle M). The three cam disks are disposed in close side-by-side relation with their depressed sectors substantially in alignment and their switch actuating cam surfaces in lateral juxtaposition. As will be clearly evident from FIG. 4, the follower roller 58 spans all three of the disks so that it is actuated by whichever cam surface of laterally adjacent pairs of surfaces first encounters the roller upon rotation in either direction. At either limit of the lost motion one of the slow-actuating surfaces 72 or 73 is fully withdrawn behind the adjacent fast-actuating surface 70 or 71.

It may now be observed from FIGS. 2 and 3 that in each direction of rotation the leading one of the low-speed actuating surfaces (72 or 73) on the central driving cam 61 is withdrawn behind the juxtaposed high-speed actuating surfaces of the trailing disks 60, 62. Conversely the trailing pair of high-speed actuating surfaces of the outer disks is withdrawn behind the juxtaposed slow-speed actuating surface of the central driving disk. Thus in each direction of movement the cam follower 58 first encounters the resultant depressed sector of the complete cam at an abrupt switch-opening surface, and is raised out of the depressed sector to switch-closing position by means of the more gradual switch-closing surface of the central cam. By comparing FIGS. 2 and 3, it will be evident that this relationship is retained by reversal of the relative cam positions upon reversal of direction of rotation. Thus it will be evident that, regardless of the direction of rotation of the complete operating cam 36, the follower 58 is moved from closed circuit position to open circuit position abruptly by means of a quick-operating cam surface such as 70 or 71 of the disk 60, and returned to switch-closing position at a lower speed by one of the more gradual cam surfaces 72, 73 of the central disk 61.

In order to ensure rapid opening of the switch contacts, it is desirable that the abrupt or high-speed cam surfaces 70, 71 permit the cam follower 58 to fall freely from the outer to the inner radial cam positions. To this end the high speed actuating surfaces 70, 71 are substantially radial as clearly indicated by FIG. 3. With respect to these substantially radial surfaces, the slow-speed actuating surfaces 72, 73 may be defined as inclined. The speed of cam follower movement at the high speed cam surfaces 70, 71 is further enhanced by the roller configuration of the follower and the lost motion between the cam disks. Specifically, refer to FIG. 3. When surface 71 arrives at the roller 58, a point is reached where the center of the roller is over-center in respect to the radial direction of surface 71. At this point the roller 58 exerts a tangential component of force on the cam disks 60 and 62 which, due to the lost motion connection, moves these disks ahead of the driving disk 61 in the direction of cam rotation. This removes the cam surface 71 from beneath the roller 58 more rapidly than due to the driving disk 61 alone.

From the foregoing it will be understood by those skilled in the art that while my invention is directed to a double-ended reversible operating cam having at least two laterally adjacent cam plates or members with a lost-motion connection therebetween, it is not necessary that the cam members be of disk configuration nor that the cam be rotatable in its movement. The invention is equally applicable to linearly movable cam members. It will be further evident to those skilled in the art that the depressed sectors of the cam need not represent the switch-opening position but that by suitable configuration and positioning of the actuating surfaces, the relation of cam rest position to switch position may be reversed from that shown. Of course, whether the switch bias be of open or to closed switch position, the depressed cam sector is engaged by action of the bias force.

It will thus be understood that while I have illustrated a preferred embodiment of my invention by way of example, various modifications will occur to those skilled in the art. I therefore wish to have it understood that I intend herein to cover all such modifications as fall within the true spirit and scope of my invention.

What I claim as new and desire to secure by Letters Patent of the United States is:

1. In an actuating mechanism for an electric switch having a contact member movable between spaced-apart circuit controlling positions, means biasing said movbale contact member to one said circuit controlling position, a cam follower coupled to actuate said movable contact member, a pair of cam plates juxtaposed in closely spaced side-by-side relation and having a limited lost-motion connection therebetween, each said cam plate having two actuating surfaces of like configuration spaced apart along the line of cam traverse, the extent of each said actuating surface along the line of traverse being no greater than the linear amount of relative displacement provided by said lost-motion connection, and the actuating surfaces of each said cam plate being substantially in lateral juxtaposition to the actuating surfaces of the other plate, said like actuating surfaces on one plate providing rapid actuating movement of said cam follower and said like actuating surfaces on the other plate providing slow actuating movement thereof, and reversible driving means positively connected to drive one said cam plate between opposite limits of movement beyond said cam surfaces in both directions of movement, said lost motion connection driving the other said cam plate in trailing relation thereby to expose to said cam follower the leading actuating surface of the trailing cam plate and the trailing actuating surface of the leading cam plate in each direction of cam movement.

2. In combination with the structure of claim 1, a vacuum type electric circuit interrupting device having a movable contact member biased to open circuit position, said positively driven cam plate being such that in each direction of cam movement said one rapid actuating cam plate effects contact opening movement, and said other slow-actuating cam plate effects contact closing movement of said cam follower.

3. In an actuating mechanism for an electric switch having a contact member movable between spaced-apart circuit controlling positions, means biasing said movable contact member to one said circuit-controlling position, a cam follower coupled to actuate said movable contact member, a pair of cam disks rotatably mounted in closely spaced concentric side-by-side relation, stop means providing a limited lost-motion connection between said cam disks and each said cam disk having two actuating surfaces of like configuration angularly spaced apart along the disk circumference and said cam disks being relatively angularly positioned so that said angularly spaced-apart actuating surfaces are laterally juxtaposed in two angularly spaced-apart pairs, the extent of each of said actuating surfaces along the disk circumference being no greater than the circumferential amount of relative displacement provided by said lost-motion connection, the like actuating surfaces on one disk providing rapid movement of said cam follower in one direction and the like actuating surfaces on the other disk providing slow reverse movement thereof, and reversible driving means connected to rotate said one cam disk a predetermined number of complete revolutions in both directions of movement, said lost motion connection driving the other said cam disk in trailing relation thereby to expose to said cam follower the leading actuating surface of the trailing cam disk and the trailing actuating surface of the leading cam disk in each direction of cam movement.

4. In an actuating mechanism according to claim 3 including in addition frictional braking means engaging said trailing cam plate.

References Cited
UNITED STATES PATENTS

| | | | |
|---|---|---|---|
| 1,909,138 | 5/1933 | Vollmer | 200—153.13 |
| 2,993,966 | 7/1961 | Smith. | |
| 3,206,569 | 9/1965 | McCarty | 200—153 XR |

ROBERT K. SCHAEFER, Primary Examiner

M. GINSBURG, Assistant Examiner

U.S. Cl. X.R.
200—11, 144